(12) United States Patent
Cusack

(10) Patent No.: US 7,878,186 B2
(45) Date of Patent: Feb. 1, 2011

(54) OUTDOOR COOKER AND METHOD OF USE

(76) Inventor: William E. Cusack, 5013 N. University St., Ste.2, Peoria, IL (US) 61614

( * ) Notice: Subject to any disclaimer, the term of this patent is extended or adjusted under 35 U.S.C. 154(b) by 666 days.

(21) Appl. No.: 11/900,934

(22) Filed: Sep. 13, 2007

(65) Prior Publication Data

US 2008/0083401 A1    Apr. 10, 2008

Related U.S. Application Data

(60) Provisional application No. 60/849,866, filed on Oct. 6, 2006.

(51) Int. Cl.
*B28D 1/32* (2006.01)
*B65D 43/22* (2006.01)

(52) U.S. Cl. .................. 126/25 R; 126/25 AA; 126/41 R; 220/830

(58) Field of Classification Search ............. 126/25 R, 126/318, 25 A, 25 AA, 41 R, 211, 190–194, 126/9 R, 541; 99/349; 16/375, 277; 220/827–830; 49/381–383; 312/319.1
See application file for complete search history.

(56) References Cited

U.S. PATENT DOCUMENTS

| | | | |
|---|---|---|---|
| 2,102,342 A | 12/1937 | Walder | |
| 2,936,697 A | 5/1960 | Kueser | |
| 3,373,733 A * | 3/1968 | Harrington et al. | 126/191 |
| 4,021,968 A | 5/1977 | Kendall | |
| 4,462,306 A | 7/1984 | Eisendrath | |
| 4,730,597 A | 3/1988 | Hottenroth et al. | |
| 4,932,390 A * | 6/1990 | Ceravolo | 126/25 AA |
| 5,213,299 A | 5/1993 | Henry | |
| 5,660,101 A * | 8/1997 | Cirigliano | 99/395 |
| 5,809,988 A * | 9/1998 | Wagner | 126/25 A |
| 5,947,007 A * | 9/1999 | O'Grady et al. | 99/340 |
| 5,983,882 A * | 11/1999 | Ceravolo | 126/25 R |
| 6,176,232 B1 | 1/2001 | Corcoran | |
| 6,705,306 B1 | 3/2004 | Dickey | |
| 6,745,673 B1 * | 6/2004 | Martinez | 99/421 H |
| 6,883,680 B2 * | 4/2005 | Hirose | 220/830 |
| 7,316,720 B2 * | 1/2008 | Cuppari et al. | 55/385.1 |
| 7,647,923 B2 * | 1/2010 | Dahl | 126/25 A |
| 2007/0045332 A1 * | 3/2007 | Kikuchi | 220/830 |

OTHER PUBLICATIONS

Photo of outdoor cooker retrieved from internet; publisher: unknown; author: unknown; title: none; 1 page; date: unknown; place of publication: unknown.

* cited by examiner

*Primary Examiner*—Kenneth B Rinehart
*Assistant Examiner*—Chuka C Ndubizu
(74) *Attorney, Agent, or Firm*—Liell & McNeil

(57) ABSTRACT

An outdoor cooking cooker having a lid biased towards an open position by a torsional spring and able to remain partially open at a plurality of partially open positions by increased friction against the lid along a pivot. The outdoor cooking cooker may also include a vertical lifting device for lifting a single rack or multiple racks out from the outdoor cooking cooker and a device for coupling the racks together. The outdoor cooking device can include a firebox that is double-walled and may be mounted upon a trailer for easier transportation between locations. A flexible peripheral seal damps sound and seals against leakage when the lid is moved to a closed position.

18 Claims, 4 Drawing Sheets

OUTDOOR COOKER AND METHOD OF USE

RELATION TO OTHER APPLICATION

This application claims priority to provisional application 60/849,866, filed Oct. 6, 2006 and entitled Meat Monster Cooker.

TECHNICAL FIELD

The present disclosure relates generally to outdoor cookers and more specifically, to a multiple configuration outdoor cooker that includes an ability to maintain a lid in a plurality of partially open positions.

BACKGROUND

Outdoor cooking is among the favorite pastimes of many. As such, the methods and equipment for doing so are considerably diverse. Cookers vary greatly in size from small, portable or indoor units to large commercial units designed to feed hundreds. Cookers further vary in purpose; some are merely to grill the food while others add a means to smoke the foods to provide varying flavors. These cookers also diversify in the fuel source used to provide heat; natural or propane gas, charcoal, and wood are all types of combustible fuels used. These combustibles further vary in how the heat is applied to the food; some cookers place the fuels directly below the food while others offset the fuel source.

Since many larger outdoor cooker lids are typically made of a metal plate which necessarily results in a cooker lid with significant weight, multiple problems are created for cooker users. One such problem is that a heavy cooker lid can be difficult to open or a user may become fatigued with repeated opening and closing cycles. A second problem is that most outdoor cooker lids are typically incapable of remaining fixed in a partially open position. To combat this, a variety of propping or lid lift assisting devices have been designed.

One method used to assist cooker users in opening heavy cooker lids is the attachment of a large, heavy counterweight on top of or behind the cooker lid that applies a force onto the cooker lid, counteracting the weight of the cooker lid. The counterweight may be as simple as a large weight attached to the lid or may involve a weight attached to the lid via a cable pulley, such that the weight is pulled downward by gravity, which helps open the lid. This counterweight is necessarily heavy in order to have the desired effect of reducing the force necessary to open the lid. The use of a counterweight to ease the opening of a cooker lid however adds a significant amount of weight and rotational inertia to the outdoor cooker itself. For a cooker having a size of twenty-four inches by sixty inches, the counter weight required would be nearly one hundred twenty pounds; a weight that could make the cooker too heavy to easily manage, cause it to lean to one side, and may be considerably expensive with modern steel prices. Counterweights attached to a pulley may need further attention as the weight or cable can pose a dangerous system and the heavy weight would likely need to be removed or otherwise secured prior to travel. Of further issue is that outdoor cooker lids using a counterweight frequently must be opened to the full extent allowable if the cooker user is to have both hands free to use inside the cooker. An outdoor cooker using a counterweight will only remain in a fully closed or fully open position without further assistance from the cooker user or another propping device.

Another method used to assist a cooker user in opening a cooker lid is the use of a compression spring attached to the outdoor cooker body that applies an upward force onto a cooker lid, pivoting the cooker lid upward. This method of assisting a cooker user in opening a cooker lid suffers from the same problems as the other methods of assisting a cooker user in opening a cooker lid; most notably the inability of the cooker user to stop the lid at any intermediary position between fully open and closed without the use of at least one hand or a propping device.

Recognizing the benefits of keeping an outdoor cooker lid fixed in a partially open position, a variety of propping devices have arisen. One type of propping device, such as the device disclosed in U.S. Pat. No. 5,213,299, is used to keep an outdoor cooker lid partially open involves two prop members adjacent to one another that are capable of having a distance between two prop ends increased, and that distance is fixed by disallowing movement between the members. A second type of propping device, which is disclosed in U.S. Pat. No. 6,176,232, includes a member that is wedged in between the cooker lid and the cooker body whereby the height of the lid is adjusted by shifting the member's proximity to the pivot. Yet a third type of propping device, such as the device disclosed in U.S. Pat. No. 6,705,306, includes a prop attached to the cooker lid with slots designed to fit onto a stop connected to the cooker body where the height of the lid is adjustable by placing slots of various heights upon the member into the stop.

These propping devices all suffer from similar inferiorities. These propping devices obstruct access to the cooking surface by the user from either the front of the cooker or along the side of the cooker and all attach to the cooker in such a manner as to make them visually apparent, reducing the overall visual appeal of the cooker. These propping devices further require extra effort by the cooker user in order to stabilize them; some require tightening and loosening, some require sliding a mechanism back and forth, and yet others require the cooker user to fit a prop onto a stop before being able to allow the lid to remain at a fixed, partially open position.

Therefore, current outdoor cooker technology suffers from two general problems with cooker lid opening assistance and partially opened cooker lid designs. First, the heavy cooker lid weight requires a considerable lifting force to open the cooker lid. Second, all current methods of reducing the lifting force needed to open the cooker lid by a cooker user require the cooker user to either open the cooker lid completely or prop the cooker lid open at a partially open position with either a propping device or with one of their own hands. Opening the cooker lid fully when the cooker user only needs the cooker lid partially open to gain the desired access to the interior of the outdoor cooker reduces the heat within the cooker and requires more effort from a cooker user than would otherwise be needed, while having to manually maneuver a secondary device to prop open the cooker lid can be cumbersome and reduce access to the cooking surface by the cooker user. The final option available to the cooker user is to use a hand to hold the cooker lid partially open, which forces the cooker user to dedicate a hand to keep the cooker lid partially open, limiting what the cooker user can do under the cooker lid. This only further reduces the effectiveness with which the cooker user can operate the cooker.

A third issue in modern outdoor cooker technologies is blending maximum access by the cooker user to cooking surfaces, maximum efficiency of an outdoor cooker's fuel source, and ease of cleaning the cooker after use. While cooking, fats and other materials may accumulate in the bottom of an outdoor cooker which can result in flare-ups, reducing food quality and potentially injuring the user. However, accessing the bottom portions of an outdoor cooker for cleaning frequently entails either lifting the cooker racks out from the cooker body or maintaining a sufficient distance between the cooker racks and the cooker bottom to be able to clean underneath the cooker racks. Leaving room under the cooker racks is inefficient, as the room left could be filled with meat or other foodstuffs intended to be cooked. Since cooker racks that have been in use are typically warm during or for some time after use or have food upon them, removal of the cooker racks to clean fat while the outdoor cooker is in use or soon thereafter is difficult. One common way of gaining access to a cooker bottom is by a mechanism designed to lift a cooker rack out of the cooker during use. One example of this type of mechanism is disclosed in U.S. Pat. No. 4,462,306. The '306' patent discloses an outdoor cooker that contains a vertical lifting device attached to a single cooker rack.

Cookers as currently used force a cooker user to choose from among many commercially available cookers with various, and often limited combinations of features. The present disclosure is directed to one or more of the problems set forth above.

SUMMARY OF THE DISCLOSURE

In one aspect of the disclosure, an outdoor cooker has a cooker lid attached to an outdoor cooker body by a pivot bar. Coupled between the cooker lid and the outdoor cooker body is a biasing device that applies a force in a lid opening direction to the cooker lid to assist a user in opening the cooker lid. Also attached to the outdoor cooker is a neutral-stop braking device that increases static friction along the pivot such that the net forces acting on the cooker lid from gravity and the biasing device are insufficient to move the cooker lid from a partially open position.

In another aspect, an outdoor cooker of the present disclosure has a cooker lid which may be variably positioned by moving a lid from a closed position to a partially open position about a pivot bar pivotally attaching the lid to an outdoor cooker body. The moving step may include lifting the lid and biasing the lid away from a closed position with a biasing device. The lid may then be stopped in a partially open position by the cooker user ending the lifting portion of the moving step because the lid may be frictionally maintained in a partially open position against an action of the biasing device and the weight of the lid.

In still another aspect, an outdoor cooker of the present disclosure may also have an upper cooker rack and a lower cooker rack, both of which may be suspended from a lifting mechanism located above the cooker racks. The racks are capable of being further configured as to have the upper cooker rack suspended from the lifting mechanism while the lower cooker rack is supported by the outdoor cooker body. The racks are further yet configurable as to have the upper cooker rack and lower cooker rack supported by the outdoor cooker body.

DETAILED DESCRIPTION

Figure 1:
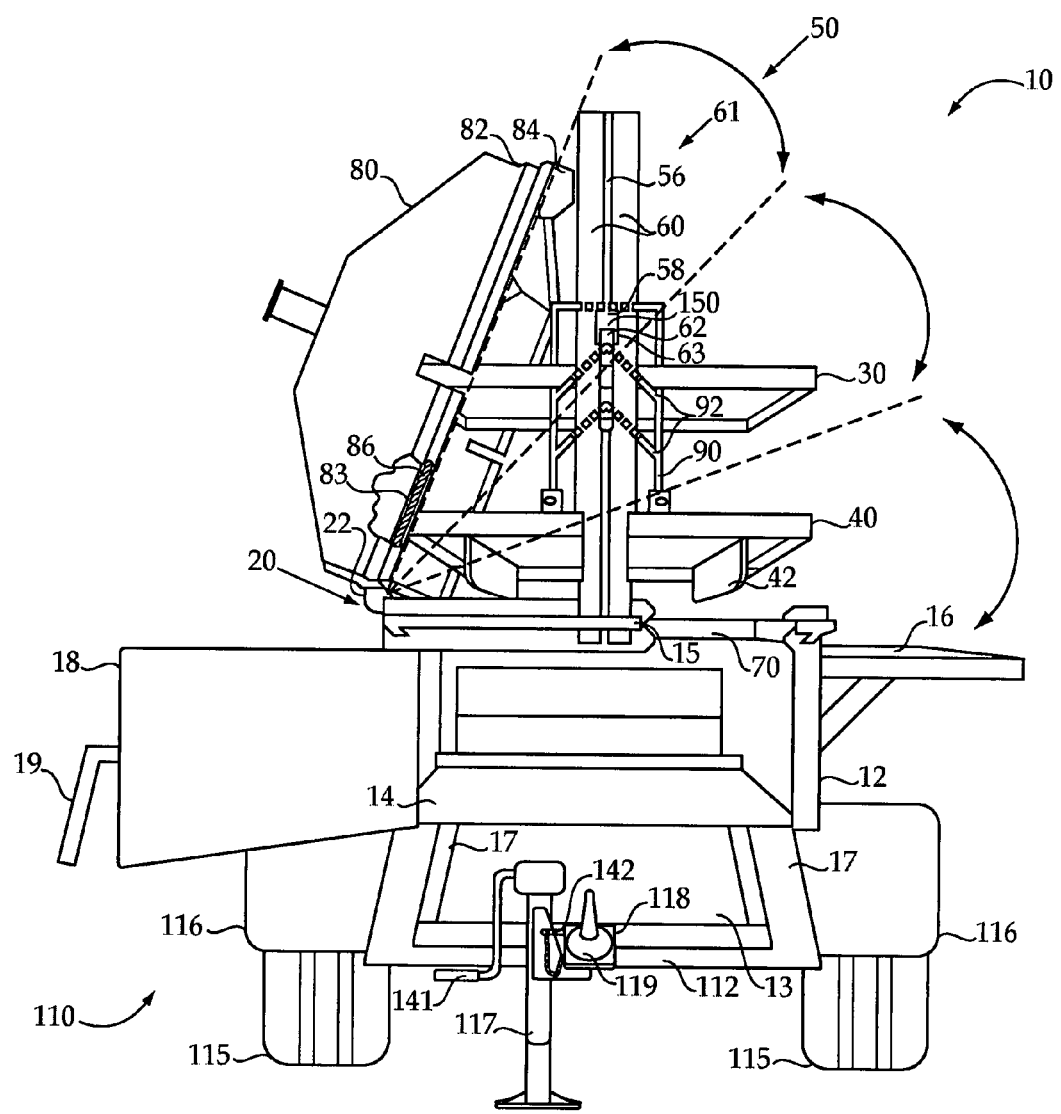
FIG. 1 is a perspective side view of an outdoor cooker according to the disclosure.
Figure 2:
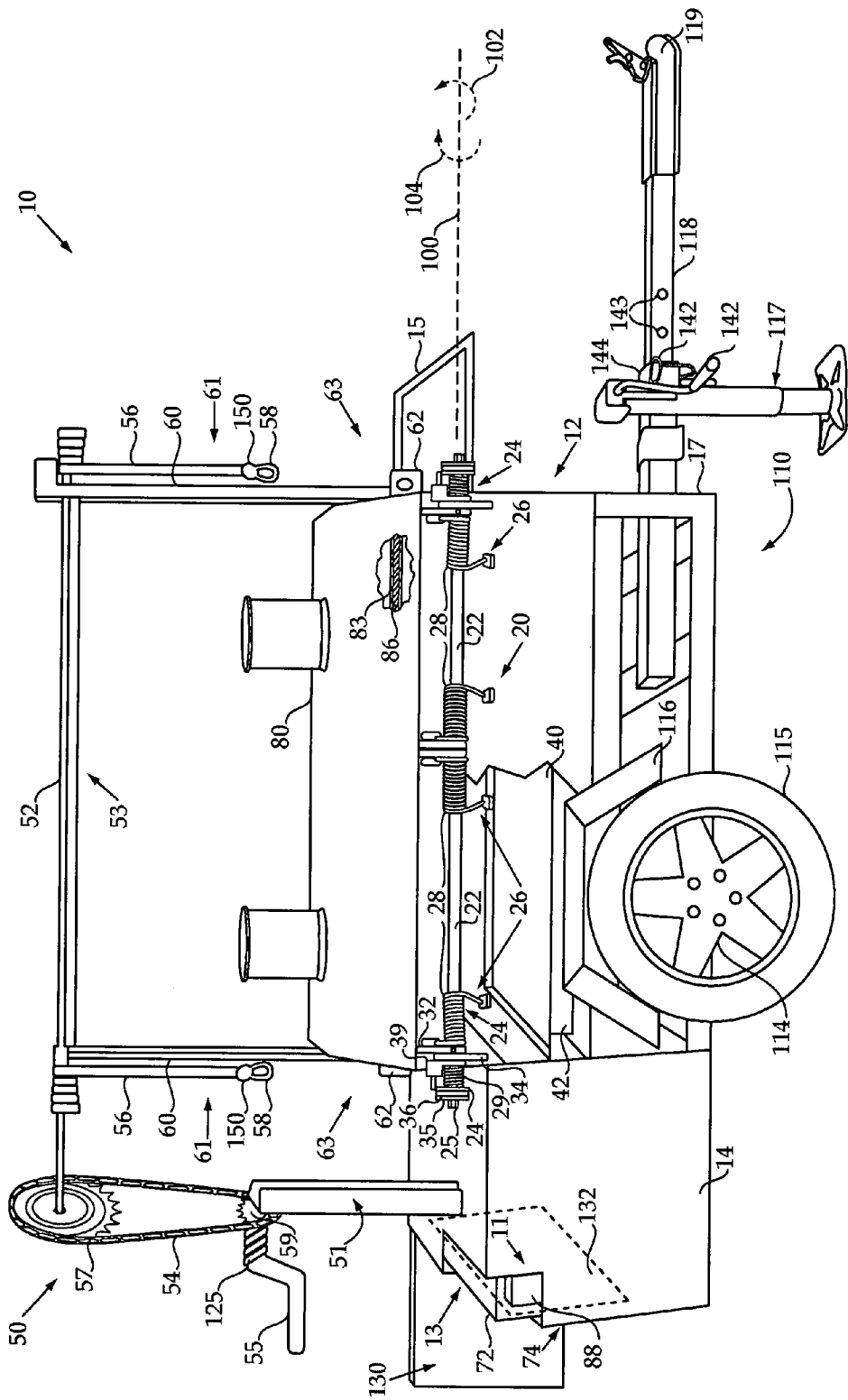
FIG. 2 is a perspective rear view of an outdoor cooker of FIG. 1.

FIG. 1 shows an embodiment of the present disclosure; a perspective side view of an outdoor cooker 10 of the present disclosure, while FIG. 2 shows a perspective rear view of the outdoor cooker 10. The outdoor cooker 10 comprises an outdoor cooker body 12, which in one embodiment may be mounted upon an outdoor cooker trailer 110. Attached to the outdoor cooker body 12 may be a double-walled firebox 13 containing an inner firebox wall 72 and outer firebox wall 74 as shown in FIG. 2. Between the inner firebox wall 72 and outer firebox wall 74 may be placed firebox insulation 11. Such firebox insulation 11 may be comprised of fiberglass high-temperature insulation 88. The double-walled firebox 13 may have attached a firebox door 130 which may cover an opening upon the double-walled firebox 132. Access to within the double-walled firebox 13 may be gained by opening the firebox door 130 and reaching through the opening upon the double-walled firebox 132. This access inside the double-walled firebox 13 allows the cooker user to be able to build and maintain a fire within the double-walled firebox 13. Those skilled in the art will recognize that the double-walled insulation 11 may or may not be applied further to the firebox door 130.

Placed within the outdoor cooker body 12 near the opening from the firebox 13 into the outdoor cooker body 12 may be a removable deflection plate (not shown) under which heat from the burning of a combustible fuel source within the firebox 13 may pass before being dispersed towards the center of the outdoor cooker body 12. The deflection plate may further be placed upon a lower cooker rack 40.

In one embodiment, an outdoor cooker body 12 may have attached to the cooker body 12 a side door 18 upon which may be a handle 19 as shown in FIG. 1. The side door 18 may further have a plurality of vents (not shown) attached. The outdoor cooker body 12 may have a bottom surface 14 and may also have a table top 16 and support legs 17 attached. A cooker accessory loop 15 for hanging cooking utensils, couplers 90, or a plurality of other cooking accessories may also be attached to the outdoor cooker body 12 as shown in FIG. 1.

In one embodiment, a lid 80 may have a lid handle 84 and a lid rim 82 as shown in FIG. 1 The lid 80 may also have a thermometer (not shown) mounted upon the lid as to monitor temperatures under the lid 80 within the main cooking chamber. The lid 80 may include a U-shaped channel 83 that receives a flexible high temperature fiberglass seal 86 along the edges of the lid 80 that may quietly contact the cooker body 12 when the lid 80 is in a fully closed position, at which position an airtight seal is made. For instance, fiberglass rope 86 may be positioned in a U-shaped channel 83 defined by the peripheral edge of the lid 80. By facilitating a seal around at least a portion of the peripheral edge of the lid 80, leakage from, and the associated temperature variations within, the cooker may be reduced. This also permits finer control of temperature and heat flow by the operator. A lid 80 may be attached to an outdoor cooker body 12 by a pivot attachment 20 containing a pivot bar 22 that may pass through a lid hinge arm 32 along a pivot axis 100 as shown in FIG. 2. A biasing device 26 such as a torsion spring 28 with a torsion preload may be mounted about the pivot bar 22 and connected at one end to the cooker body 12 and connected at the other end to the cooker lid 80 to supply a biasing torque 104 upon the lid as shown on FIG. 2. The lid 80 will also necessarily have a weight torque 102 about a pivot axis 100 due to its mass properties.

Figure 3:
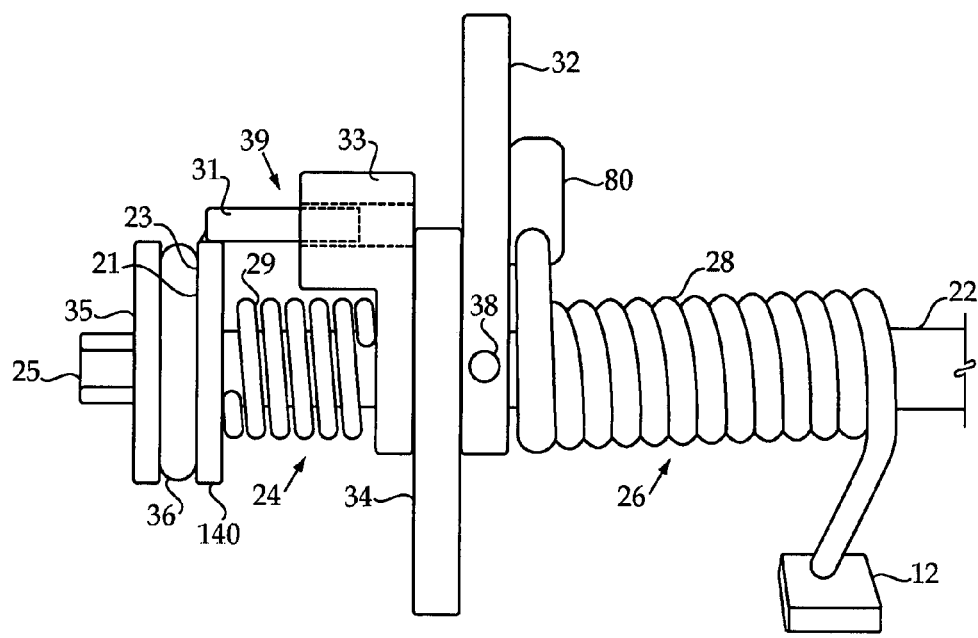
FIG. 3 is an enlarged view of the biasing and braking devices according to an aspect of the disclosure.

In one embodiment, a rotational friction or neutral stop braking device 24, which includes a compression spring 29, may be mounted about the pivot bar 22 as to apply a force to a large washer plate 140 to increase friction between a first surface 21 and second surface 23 as illustrated on FIG. 3; the first surface 21 potentially being a surface of a clutch disc 36. The compression spring may further be attached to the large washer plate 140. The clutch disc 36 may be comprised of a carbon clutch material, though it may be recognized that the use of any of a plurality of other materials or designs having a low coefficient of dynamic friction and a high coefficient of static friction may be within the scope of this disclosure. Or, the disc may be eliminated so that two metal surfaces bear directly against each other to provide the necessary friction. Opposing the surface of the clutch disc 36 contacting the second surface 23 may be a locking nut 25 holding a washer 35 against the clutch disc 36, keeping the compression spring 29 horizontally stationary and rotatably fixing the locking nut 25 relative to the pivot bar 22. The locking nut 25 may be attached to the pivot pin via threads upon the end of the pivot bar 22 and may further be welded to the washer 35. A nylon (not shown) locking aspect of the nut 25 may resist further tightening or untightening due to many cycles of lid 80 opening and closing. Thus, the locking nut 25 may apply a force onto the washer 35 as the lid 80 is pivoted, which in turn may create a second frictional force between the washer 35 and the clutch disc 36. Thus, the rotational friction or neutral stop braking device 24 may comprise essentially two braking surfaces. A pre-load on the compression spring 29 may be further adjusted by moving the locking nut 25, which may be referred to as a spring adjuster, towards or away from the compression spring 29.

The large washer plate 140 having a second surface 23 may be prevented from rotating by an attachment device 39 that rotatably fixes the large washer plate 140 to a body hinge arm 34 that is attached to the cooker body 12. The attachment device 39 may further comprise an attachment device arm 31 and an attachment device receptor 33. The attachment device arm 31 may be inserted into a receiving bore the attachment receptor 33 such that the attachment device arm 31 may be unrestrained only from sliding horizontally inward and outward from the attachment device receptor 33, and unable to move otherwise. Thus, the large washer plate 140 that may be attached (e.g. welded) to the attachment device arm 31 may be unable to rotate about the pivot bar 22 or otherwise move, with the exception of horizontally towards and away from the attachment receptor 33, via adjustment of nut 25. The lid hinge arm 32 may be fixed to the pivot bar 22 by a locking pin 38 that passes through both the lid hinge arm 33 and the pivot bar 22. Thus, as the lid 80 may be opened, the pivot bar 22 may rotate with the lid 80. The rotation of the pivot bar 22 thus may further rotate the locking nut 25 and washer 35, which may rotate with pivot bar 22. Thus, as the lid 80 is rotated upwards, the lid hinge arm 32 may be rotated, which may further rotate the pivot bar 22. The rotation of the pivot bar 22 may rotate the locking nut 25, which may further rotate a washer 35 in contact with a clutch disc 36. As the clutch disc 36 may not be rotatably fixed, the frictional forces between the clutch disc 36 and the washer 35 may cause the clutch disc 36 to rotate during the opening of the lid 80 due to static friction between the clutch disc 36 and washer 35. Opposing this rotation may be the large washer plate 140 which may be rotatably fixed, whereby rotation of the clutch disc 36 resulting from friction between the clutch disc and the washer 35 would necessarily result in dynamic friction between the large washer plate 140 and the clutch disc 36. Let it be recognized that this disclosure encompasses both a clutch disc 36 which may rotate along with movement of the lid 80 due to static friction between the washer 35 and clutch disc 36, as well as a clutch disc frictionally rotatably fixed due to static friction between the clutch disc 35 and the large washer plate 140, as well as any variation or combination of those frictional forces described above used to cease rotation of a pivot bar 22. The neutral stop braking device 24 thus may further have a static friction between the first surface 21 and second surface 23 or between the clutch disc 36 and washer 35 greater than the biasing torque 104 and weight torque 102 such that the lid 80 may stay open at a plurality of partially open positions.

In one embodiment, FIG. 2 illustrates an outdoor cooker 10 that may have a lifting mechanism 50 attached to the outdoor cooker body 12, which may comprise an axle 52 and a supporting cross-bar 53 connected to a vertically oriented guide 61. The vertically oriented guide 61 may further be comprised of two pairs of parallel guide rails 60 which may be L-shaped rails mounted parallel to the travel of the cooker racks during the lifting of the racks. A member 62, such as a vertically oriented plate 63 may pass in between a pair of guide rails 60.

Figure 4:
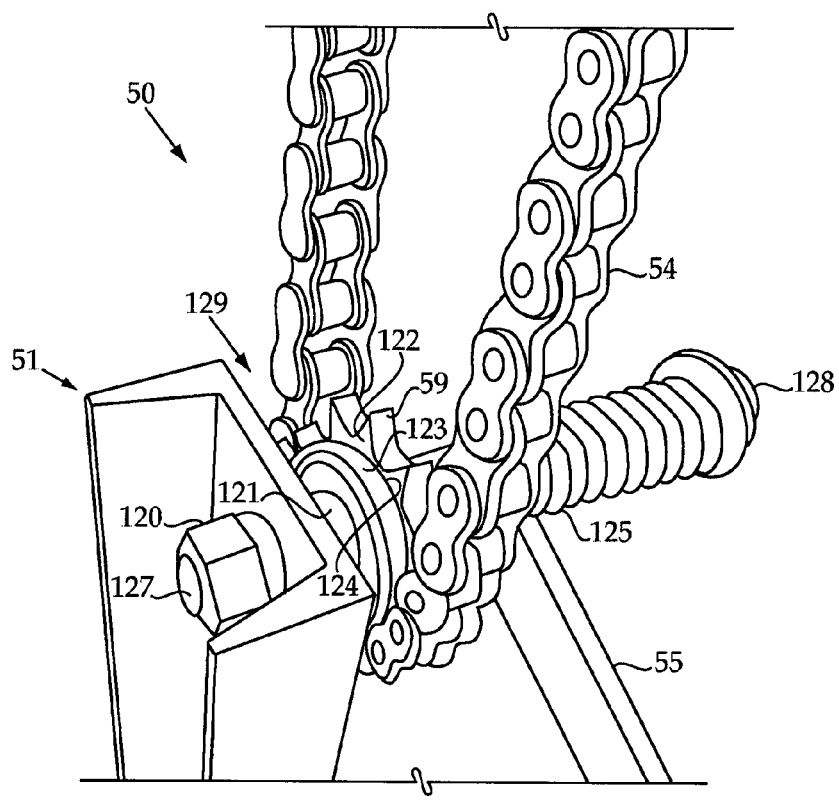
FIG. 4 is an enlarged view of the lower sprocket and lifting mechanism neutral braking device according to an aspect of the disclosure.

An upper sprocket 57 may be attached at one end of the axle 52. A lower sprocket 59 may be located below the upper sprocket 57 and supported by a lower sprocket support 51 and a lifting chain 54 may operably connect the upper sprocket 57 to the lower sprocket 59. A lifting mechanism handle 55 may be operably attached to the lower sprocket 59 as to rotate the axle 52. A cable 56 may also be operably attached to the axle 52. FIG. 4 shows a second embodiment of a neutral stop braking device, a lifting mechanism neutral stop braking device 129. A lifting mechanism axle 127 that may be mounted onto the lower sprocket support 51 by a lifting mechanism nut 120 such that the lifting mechanism axle 127 is rotatably fixed relative the lower sprocket support 51. The lower sprocket 59 and handle 55 may be mounted about the lifting mechanism axle 127. At the opposing end of the lifting mechanism axle 127 may be mounted a lifting mechanism compression spring 125 that may apply a force onto the handle 55 and lower sprocket 59. In turn, the lower sprocket 59, having a first lifting mechanism surface 122 may then apply a force onto a lifting mechanism clutch plate 123 having a second lifting mechanism surface 124 and positioned on the opposing side of the lower sprocket 59 as the lifting mechanism compression spring 125. The lifting mechanism clutch plate 123 may further be comprised of a carbon clutch material. Thus, the lifting mechanism compression spring 125 acts to increase friction between the first lifting mechanism surface 122 and the second mechanism surface 124. Since the lifting mechanism clutch plate 123 may rotate about the lifting mechanism axle 127 due to friction against the lower sprocket 59, the rotational motion of the lifting mechanism clutch plate 123 is countered by friction against the lifting mechanism clutch plate 123 by a lifting mechanism washer 121 that may be fixed relative to the lower sprocket support 51 and lifting mechanism axle 127. Thus, the lifting mechanism compression spring 125 acts to increase friction between the lower sprocket 59 and the lifting mechanism clutch plate 123, as well as between the lifting mechanism clutch plate 123 and the lifting mechanism washer 121. These features thus constitute another version and use of a neutral stop brake according to the disclosure. Thus, any rack lifted can be stopped at any vertical position, and will stay there due to the action of the neutral stop braking device. A nut 128 allows the preload on lifting mechanism spring 125 to be adjusted, which allows the friction level to be increased or decreased.

Figure 5:
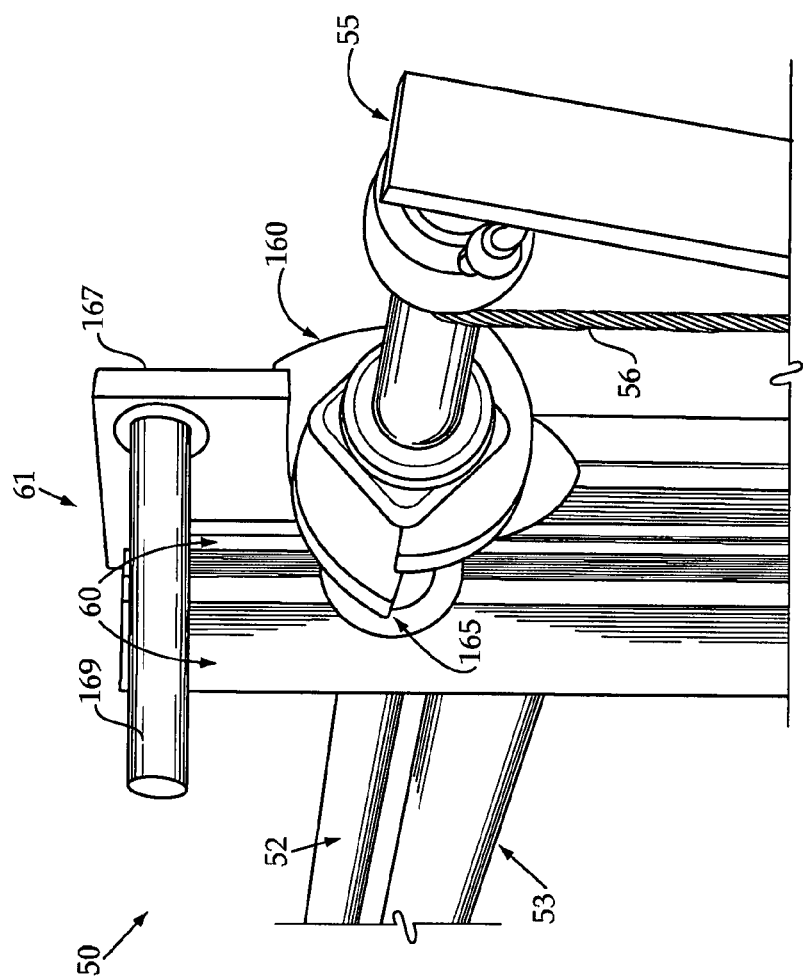
FIG. 5 is an enlarged view of a second embodiment of a lifting mechanism.

A second embodiment of a lifting mechanism 50 is illustrated on FIG. 5. The lifting mechanism 50 may comprise an axle 52 and a supporting cross-bar 53 connected to a vertically oriented guide 61. The vertically oriented guide 61 may further be comprised of two pairs of parallel guide rails 60 which may be mounted parallel to the travel of the cooker racks during the lifting of the racks. A lifting mechanism handle 55 may be operably connected to rotate the axle 52. A cable 56 may further be operably attached to the axle 52. A one way locking disc 160 having at least one locking tooth 165 may also be operably coupled to the axle 52. The one way locking disc 160 may be in contact with a locking plate 167 pivotally attached to the vertically oriented guide 61 such as to restrict the movement of the locking plate to only movement in the vertical direction. Thus, as the handle 55 is rotated upwards, the axle 52 and one way locking disc 160 rotate, causing the locking plate 167 to slowly rise from contact with the one way locking disc 160. Upon reaching and passing the locking tooth 165, the locking plate 167 falls into contact with the lower level of the one way locking disc 160. If the cooker user were to release the handle 55, the weight of the object attached to the cable 56 may rotate the axle 52, handle 55, and locking disc 160 in the reverse direction. However, the locking place 167 may contact the locking tooth 165, ceasing the movement of the axle 52. To release the locking plate 167, a user may lift the locking plate 167 using a locking plate handle 169.

FIG. 2 illustrates that at least one cable 56 may be attached to and helically wound upon the axle 52. The cable 56 may have a connective device 58 attached, the connective device 58 being capable of being connected to and removed from an upper cooker rack 30 by opening the connective device 58 and sliding the connective device 58 out from the member 62. One such connective device may be a carabiner 150. The cable 56 may be further attached to the axle 52 such that the cable 56 is oriented at an angle off a vertical being greater than zero degrees when the cable 56 is connected to the upper cooker rack 30 to promote tight helical winding in a single layer or successive layers. This provides the benefit to a cooker user by causing the cable 56 to wrap inward in a helical pattern as the axle is rotated, eliminating kinks, bunching, and abrupt movements that may otherwise occur if the cable wound onto itself.

The outdoor cooker 10 may have a first configuration having an upper cooker rack 30 resting upon a ledge 70 adjacent a top of the outdoor cooker body 12 and the lower cooker rack 40 operably attached to a plurality of prop rails 42 upon the under side of the lower cooker rack 40 and resting upon a bottom surface of the outdoor cooker body 14. The outdoor cooker 10 may have a second configuration having the upper cooker rack 30 suspended from the lifting mechanism 50 above the outdoor cooker body 12 and the lower cooker rack 40 operably attached to a plurality of prop rails 42 upon the underside of the lower cooker rack and resting upon a bottom surface of the outdoor cooker body 14. The outdoor cooker 10 may have a third configuration having the upper cooker rack 30 suspended from the lifting mechanism 50 above the outdoor cooker body 12 and the lower cooker rack 40 suspended from the lifting mechanism 50 above a bottom surface of the outdoor cooker body 14 and coupled to the upper cooker rack 30 by a coupler 90. The coupler 90 may further include a plurality of vertically spaced coupling hooks 92 for adjusting a separation distance between the upper cooker rack 30 and the lower cooker rack 40 when the outdoor cooker 10 is in the first or third configuration.

The outdoor cooker 10, may be placed upon an outdoor cooker trailer 110. The outdoor cooker trailer 110 may comprise a wheel axle 112 connected to at least one wheel 114 having a tire 115 attached. A wheel fender 116 may also be attached above the wheel 114. The outdoor trailer may also have a removable trailer tongue 118 that slides into or out of a square tube 144. Tongue 118 may be fixed to trailer 110 and one end connected to a tow vehicle via hitch 119 at its opposite end via a removable pin 142. Cooker 10 may be supported by a trailer third wheel or stand 117 that is attached to a square tube 144. The height of stand 17 may be adjusted in a conventional manner with crank handle 141 to level the cooker. Tongue 118 may include a number of pin holes 143 to allow the user to adjust the tongue length to suit a particular tow vehicle geometry.

Those skilled in the art may recognize that a plurality of smokestacks (two shown on lid 80) and vents (not shown) may be attached to the cooker body 12, cooker lid 80, and firebox 13 which may be further opened, partially opened or closed in order to provide air into the cooker body 12, control heat flow through the cooking area and to provide temperature control. The smokestacks may be placed in a variety of locations where the smokestack openings may be easily reached and adjusted, such as on top of the cooker lid 80 or protruding out the side of the cooker body 12 opposite the firebox 13 and may have a variety of shapes. Vents may also be integrated onto the cooker body 12, cooker lid 80 or the firebox 13 which may be slid open and shut to further control the temperature under the cooker lid 80 and within the cooker body 12.

Those skilled in the art may further recognize that a fire basket (not shown) for placing and burning combustible fuels, which may be an object enclosed by metal mesh on five of six sides with the sixth side open for access to the combustible fuels, may be placed within the firebox 13 to further contain debris from the combustible fuel source. One location of many within the firebox 13 upon which the fire basket may be placed is upon an elevated grate within the firebox 13. Those skilled in the art may further recognize that a plurality of combustible fuels may be used that includes but is not limited to natural or propane gas, charcoal, and wood.

Those skilled in the art may further yet recognize that a further level of variability may be incorporated into the outdoor cooker by the attachment of a rotisserie device (not shown) above the outdoor cooker body 12. One such method out of many methods of connecting a rotisserie may be integrated into the lifting mechanism axle 52 by connecting the rotisserie to the connective devices 58 upon the cable 56. Thus, when using the cooker body 12 to place and burn combustible fuel sources, the rotisserie may be raised by the lifting mechanism 50 to be operated directly above the heat source or when using the firebox 13 to provide heat, the rotisserie may be lowered towards the cooker body 12 and covered with the cooker lid 80. This provides yet further variability to the present disclosure.

Those skilled in the art may further yet realize that a plurality of different surfaces and designs may be used to form the cooking surfaces upon the cooker racks. Such surfaces may include but in no way may be limited to steel mesh grate, steel rods, stainless steel mesh grate, and stainless steel rods.

While the outdoor cooker 10 described above may be of an intermediate size of dimensions around twenty-four inches by sixty inches and having cooker lid 80 weight of around 120 pounds, those skilled in the art may recognize that those features disclosed may apply to all outdoor cookers regardless of dimension or weight.

INDUSTRIAL APPLICABILITY

The present disclosure described above relates generally to grills, smokers, and other outdoor cookers; and more specifically, to increasing the adjustability and variability of grills, smokers and other outdoor cookers. By disclosing a mechanism by which a cooker lid is biased towards an open position but may remain partially open in a plurality of positions, a multitude of benefits are provided to the cooker user. These benefits may include complete access by the cooker user to the cooking surface with both hands, the ability to easily adjust the height of the cooker lid 80 without having to adjust a secondary propping device and the ability of a cooker user to retain heat under the lid 80 by opening the lid 80 partially to work under the lid 80, rather than being required to lift the lid 80 fully, allowing considerable heat to escape.

The amount of heat allowed to escape from under the cooker lid 80 may be further reduced by the use of a high temperature fiberglass seal 86 along the U-shaped edge chanel 83 of the cooker lid 80 that contact the cooker body 12 when the cooker lid 80 is in a fully closed position. In other words, both the lid 80 and the cooker body 12 contact peripheral seal 86 when the lid is moved to the closed position. During construction, it may be difficult to get a tight seal around the edges of the cooker lid 80 due to shifting temperatures of the metal when welding. The fiberglass seal 86 being more flexible is able to fill these subtle shifts in alignment, providing a much better fit. The fiberglass seal 86 further provides a benefit to the user by acting as a muffler for noise resulting from contact between the cooker lid 80 and the cooker body 12 when the lid 80 is closed. While previous usages of a metal on metal would have resulting in a large clanging sound upon closing to less than an airtight seal; the fiberglass seal 86 is further able to dampen this sound. In an alternative, the seal may be located in the cooker body edge 70 without departing from the scope of the present disclosure.

The present disclosure described herein relates to easing the opening of an outdoor cooker lid 80 by a cooker user. While previous efforts in cooking technologies have taught that it is advantageous to assist a cooker user in opening a cooker lid 80, they all have suffered from similar shortcomings. Some required bulky equipment such as a heavy counterweight or sprockets. All were unable to keep the cooker lid partially open, absent a prop-type mechanism. The present disclosure is capable of allowing a cooker user to variably position a lid 80 for an outdoor cooker 10 by moving a lid 80 from a closed position to a partially open position about a pivot bar 22 pivotally attaching the lid 80 to the outdoor cooker body 12. This may be accomplished by the user lifting the lid 80 while biasing the lid away from a closed position with a biasing device 26 and upon reaching a desired partially open position, the user is able to stop lifting the lid 80 and frictionally maintain the lid 80 in a partially open position against an action of the biasing device 26 and the weight of the lid 102. The biasing devices, such as a compression spring 29 containing a torque pre-load mounted about the pivot bar 22 and attached to the cooker lid 80 and cooker body 12, acts to provide an opening force upon the cooker lid 80, reducing the overall net downward force of the cooker lid resultant from the cooker lid's weight 102. The effect of this for the cooker user is that a far less force needs to be applied onto the cooker lid 80 in order to open the lid 80; resulting in cooker lid operation that requires less efforts and energy to operate. This further provides for cooker users to quickly and easily vary the temperature under the cooker lid 80, amongst other benefits, with minimal effort by simply lifting the cooker lid 80 to the desired height and leaving the cooker lid 80 positioned at that height.

The present disclosure further relates to biasing the lid away from a closed position by positioning a torsion spring 28 about the pivot bar and increasing a torsional pre-load on the spring 28 by closing the lid 80. The frictionally maintaining the lid 80 in a partially open position may be done by pushing a first surface 21 against a second surface 23 by using a compression spring.

While previous disclosures embody using an independent prop as a physical barrier to keep cooker lids partially open, this disclosure is able to maintain a cooker lid 80 in a partially open position without the use of a prop. This disclosure allows the cooker user retain full access to the cooking surface while the cooker lid 80 is partially open. Not only does the present disclosure embody an outdoor cooker 10 without a prop impeding access to the cooking surface, but the present disclosure doesn't force a cooker user to use one hand to adjust and move the prop while being forced to hold open the cooker lid 80 with a single hand; rather the cooker user is free to use both hands to open the cooker lid 80. Lastly, by not having a prop, the outdoor cooker is able to retain the original aesthetic features of the cooker rather than having an extra, bulky part attached onto the outdoor cooker which would then need to be stored and kept track of.

The present disclosure described above also relates generally to a method for easily cleaning an outdoor cooker 10. To clean out an outdoor cooker 10 of the present disclosure, both cooker racks are connected to the lifting mechanism 50 via a connective device 58 by the cooker user and the racks are then raised by operating the lifting mechanism 50, lifting both cooker racks out from the outdoor cooker body. When both cooker racks are lifted out from the cooker body, there is a gap between the lower cooker rack 40 and the bottom of the cooker body 14 where debris may have accumulated during operation of the outdoor cooker 10. The cooker user has easy access to this debris at the bottom of the outdoor cooker body 14 through a side door 18 on the cooker body that opens into the cooker body 12 below the racks. The side door 18 may have a plurality of vents (not shown) which may be opened and closed to adjust cooker temperature and heat flow. The opening in the side door 18 allows for quick and easy cleaning by the cooker user by simply inserting what is known in the art as an ash hoe or similar object into the cooker body 12 and scraping material into the firebox 13 for later removal or out the side of the cooker body 12 directly. This allows the cooker user to clean out the cooker 10 as needed while fats are still warm, liquid and easily removable, without having to physically grab and lift the cooker racks out and allows the cooker user to further clean out the outdoor cooker 10 by removing ash and other objects from the cooker body 12 without having to clean around cooker racks or other hot objects. The present disclosure further allows the cooker user to clean out the outdoor cooker 10 during cooker use by simply following the same steps above instead of having to remove the food from the cooking surface before cooker rack lifting, allowing the cooker user to make full use of the cooking space within the outdoor cooker 10 by allowing the cooker user to fill the outdoor cooker 10 with multiple cooker racks. While previous disclosures have taught how to lift a single cooker rack out of an outdoor cooker, this disclosure further teaches how to lift and use multiple cooker racks inside the outdoor cooker, maximizing the efficiency and volume of the cooking area without having to sacrifice access to the inside of the outdoor cooker body 12. The firebox 13 may further be more easily cleaned by simply removing and dumping the debris out from a fire basket (not shown) located on top of an elevated grate within the firebox 13 that housed the combustible fuel source, instead of having to clean out the entire firebox 13.

The present disclosure described above further relates to the ability of a cooker user to move an upper cooker rack 30 relative to a fire when using the cooker 10 as a grill. During this type of usage, the combustible fuel source may be placed and combusted within the cooker body 12, directly below the upper cooker rack 30. One method of placing the combustible fuel source into the cooker body 12 is to load the fuel source into a fire basket, such as the type described earlier for use within a firebox 13. and place the basket in the cooker body 12. By having a lower cooker rack 40 that is easily removable, a fuel source may be brought immediately under or offset from food placed upon the upper cooker rack 30 to cook food, reducing the need to build a large-scale fire in the firebox 13 for a small-scale cooking job and allowing the cooker user to either cook directly below the food or indirectly or offset from the food. However, the ability of the cooker user to raise the upper cooker rack 30 out from the cooker body 12 allows the cooker user to build both larger and smaller sized fires within the cooker body 12 and to move the food towards and away from the fire as necessary. The cooker user is still free to cook using heat combusted from materials within the firebox. By incorporating a neutral-stop braking device 129 into the lifting mechanism 50, the present disclosure allows a user to not only lift racks out from the cooker, but further allows the cooker user to leave those racks positioned at some height relative the outdoor cooker body 12 without the use of a locking device that may require an extra hand or extra effort to keep the cooker rack in place. This is beneficial to the cooker user not only as an energy saving device, but also in the case of situations where the food products need to be removed from the heat with some urgency. In the event that the temperature within the outdoor cooker 10 gets too hot or that the combustible material flares up creating a hazard, the cooker user can quickly and safely remove the food from the heat source and leave it away from the heat without having to reach into the heat source to lock the racks in place. Thus, the present disclosure not only saves time and effort, but it further provides safety for the cooker user.

Yet another level of variability arising from the present disclosure is that of the combination of the double-walled firebox 13 and the ability to use the lower cooker rack 40 to place and burn combustible fuel sources; allowing the cooker user to grill either directly or offset from food placed on the upper cooker rack 30. The double-walled firebox 13 may be insulated with a high temperature fiberglass insulation 88 to protect the cooker user from burns resulting from contact with the firebox 13, as well as providing a more efficient means for burning combustible fuel sources within the firebox 13. By allowing the cooker user to have access to both the upper and lower cooker racks, the user is further able to use the lifting mechanism 50 to lift out the upper cooker rack 30, place any desired combustible fuel source upon the lower cooker rack 40 and ignite it, with full access by the user to the upper cooker rack 30 once lowered from the lifting mechanism 50.

A further level of variability arises from the locations of the multiple cooking racks within the cooker body 12. By having an upper cooker rack 30 and lower cooker rack 40, the upper cooker rack 30 necessarily is located in a higher temperature zone as heat emanating from the combustible heat source necessarily rises. Thus, food that needs to be cooker more quickly may be place upon the upper cooker rack 30, while food that needs to be cooked more slowly may be placed upon the lower cooker rack 40. This is of particular advantage to those cooker users who may be using the outdoor cooker 12 in cooking contests.

The outdoor cooker 10 may further be mounted onto a trailer 110 for easy travel long-distances. As one application of the present invention is larger-scale, outdoor cookers, there may be a need to transport the outdoor cooker 10 to a plurality of venues, particularly if the outdoor cooker 10 is to be used in a commercial capacity. By adding the ability to trailer the cooker 10, considerable efforts to load and unload the outdoor cooker 10 onto an independent trailer or into a truck bed are no longer needed, a user can simply place the trailer tongue 118 onto the trailer hitch of the vehicle used to transport the cooker and trailer the cooker 10 where it is desired to be. One the user arrives, the trailer 110 can easily be moved into place and the trailer tongue 118 removed from the trailer 110 for maximum transportability and access around the outdoor cooker 10. However, those skilled in the art may recognize that a plurality of other devices may be attached to the outdoor cooker 10 for easier movement, such as casters, but that no such feature shall be a requisite feature for use of the outdoor cooker 10.

Those skilled in the art will appreciate that the scope of this disclosure is much broader than that shown and described. Thus, many changes from the described embodiment that might occur to one with ordinary skill will still fall within the intended scope as defined by the claims set forth below.

What is claimed is:

1. An outdoor cooker comprising:
    an outdoor cooker body;
    a lid having a weight and being pivotally attached to the outdoor cooker body via a pivot bar;
    the weight of the lid corresponding to a weight torque on the lid about a pivot axis;
    a biasing device operably coupled between the outdoor cooker body and the lid to bias the lid away from a closed position;
    the biasing device corresponding to a biasing torque on the lid about the pivot axis that reduces an overall torque on the lid resulting from the weight of the lid at the closed position;
    a rotational friction, neutral stop braking device operable to resist lid movement about the pivot axis;
    the rotational friction, neutral stop braking device having a static friction greater than the biasing torque plus the weight torque such that the lid stays stationary at a plurality of partially open positions;
    wherein the frictional device includes at least one compression spring mounted about the pivot bar, and being compressed along the pivot axis to bias a first surface into friction contact with a second surface;
    wherein a pre-load of compression spring is adjustable via a spring adjuster that is attached by threads; and
    a pre-load of the at least one compression spring being changed by moving the spring adjuster toward or away from the at least one compression spring by rotation on the threads.

2. The outdoor cooker of claim 1 wherein the biasing device includes at least one torsion spring mounted about the pivot bar; and
    a torsional pre-load on the at least one torsion spring increases throughout movement of the lid from a fully open position toward a closed position.

3. The outdoor cooker of claim 1 including a peripheral rope seal mounted in a U-shaped channel defined by one of the lid and the cooker body;
    the cooker body includes a side opening to access and clean debris from a bottom of the outdoor cooker body.

4. An outdoor cooker comprising:
    an outdoor cooker body;
    a lid having a weight and being pivotally attached to the outdoor cooker body via a pivot bar;
    the weight of the lid corresponding to a weight torque on the lid about a pivot axis;

a biasing device operably coupled between the outdoor cooker body and the lid to bias the lid away from a closed position;

the biasing device corresponding to a biasing torque on the lid about the pivot axis that reduces an overall torque on the lid resulting from the weight of the lid at the closed position;

a rotational friction, neutral stop braking device operable to resist lid movement about the pivot axis;

the rotational friction, neutral stop braking device having a static friction greater than the biasing torque plus the weight torque such that the lid stays stationary at a plurality of partially open positions; and the outdoor cooker has a first configuration with an upper cooker rack supported on a ledge adjacent a top of the outdoor cooker body, and a lower cooker rack supported on prop rails in contact with a bottom of the outdoor cooker body;

the outdoor cooker has a second configuration with the upper cooker rack being suspended from a pair of cables of a lifting mechanism and the lower cooking rack supported on prop rails in contact with a bottom of the outdoor cooker body; and the outdoor cooker has a third configuration with the upper cooker rack and the lower cooker rack suspended from the pair of cables of the lifting mechanism.

5. An outdoor cooker comprising:

an outdoor cooker body;

a lid pivotally attached to the outdoor cooker body;

an upper cooker rack;

a lower cooker rack positioned under the upper cooker rack;

a lifting mechanism for the cooker racks that is positioned outside of a cooking chamber defined by the outdoor cooker body and the lid, said lifting mechanism being attached to the outdoor cooker body and located at least partially vertically above the lid, and the lifting mechanism includes a small sprocket coupled to a large sprocket by a lifting chain;

the upper cooker rack, the lower cooker rack, the lifting mechanism, and the outdoor cooker body having a first configuration with the upper cooker rack supported by the outdoor cooker body and the lower cooker rack being one of supported by the outdoor cooker body and suspended from the upper cooker rack;

the upper cooker rack, the lower cooker rack, the lifting mechanism, and the outdoor cooker body having a second configuration with the upper cooker rack being suspended from the lifting mechanism and the lower cooker rack being supported by the outdoor cooker body; and the upper cooker rack, the lower cooker rack, the lifting mechanism, and the outdoor cooker body having a third configuration with the upper cooker rack and lower cooker rack being suspended from the lifting mechanism.

6. The outdoor cooker of claim 5 with a lifting mechanism comprising:

an axle having the large sprocket attached thereto;

an axle support mechanism attached to the outdoor cooker body onto which the axle is operably coupled;

a handle having the small sprocket attached thereto, and being operably connected to rotate the axle by the lifting chain;

at least one cable operably connected to the axle; and at least one connective device upon the cable.

7. An outdoor cooker comprising:

an outdoor cooker body;

a lid pivotally attached to the outdoor cooker body;

an upper cooker rack;

a lower cooker rack positioned under the upper cooker rack;

a lifting mechanism for the cooker racks that is positioned outside of a cooking chamber defined by the outdoor cooker body and the lid, said lifting mechanism being attached to the outdoor cooker body and located at least partially vertically above the lid, and the lifting mechanism includes a small sprocket coupled to a large sprocket by a lifting chain;

the upper cooker rack, the lower cooker rack, the lifting mechanism, and the outdoor cooker body having a first configuration with the upper cooker rack supported by the outdoor cooker body and the lower cooker rack being one of supported by the outdoor cooker body and suspended from the upper cooker rack;

the upper cooker rack, the lower cooker rack, the lifting mechanism, and the outdoor cooker body having a second configuration with the upper cooker rack being suspended from the lifting mechanism and the lower cooker rack being supported by the outdoor cooker body;

the upper cooker rack, the lower cooker rack, the lifting mechanism, and the outdoor cooker body having a third configuration with the upper cooker rack and lower cooker rack being suspended from the lifting mechanism;

a lifting mechanism comprising:

an axle having the large sprocket attached thereto;

an axle support mechanism attached to the outdoor cooker body onto which the axle is operably coupled;

a handle having the small sprocket attached thereto, and being operably connected to rotate the axle by the lifting chain;

at least one cable operably connected to the axle;

at least one connective device upon the cable; and the at least one cable operably attached to the lifting mechanism being positioned such that the at least one cable is oriented at an angle off a vertical being greater than zero degrees to promote helical winding of the cable on the axle when the outdoor cooker is moved to either the second or third configuration.

8. An outdoor cooker comprising:

an outdoor cooker body;

a lid pivotally attached to the outdoor cooker body;

an upper cooker rack;

a lower cooker rack positioned under the upper cooker rack;

a lifting mechanism for the cooker racks that is positioned outside of a cooking chamber defined by the outdoor cooker body and the lid, said lifting mechanism being attached to the outdoor cooker body and located at least partially vertically above the lid, and the lifting mechanism includes a small sprocket coupled to a large sprocket by a lifting chain;

the upper cooker rack, the lower cooker rack, the lifting mechanism, and the outdoor cooker body having a first configuration with the upper cooker rack supported by the outdoor cooker body and the lower cooker rack being one of supported by the outdoor cooker body and suspended from the upper cooker rack;

the upper cooker rack, the lower cooker rack, the lifting mechanism, and the outdoor cooker body having a second configuration with the upper cooker rack being suspended from the lifting mechanism and the lower cooker rack being supported by the outdoor cooker body;

the upper cooker rack, the lower cooker rack, the lifting mechanism, and the outdoor cooker body having a third configuration with the upper cooker rack and lower cooker rack being suspended from the lifting mechanism;

a lifting mechanism comprising:
  an axle having the large sprocket attached thereto;
  an axle support mechanism attached to the outdoor cooker body onto which the axle is operably coupled;
  a handle having the small sprocket attached thereto, and being operably connected to rotate the axle by the lifting chain;
  at least one cable operably connected to the axle;
  at least one connective device upon the cable; and
wherein the connective device is a carabiner disconnectable from a hole through a vertically oriented plate attached to the upper cooker rack when in the first configuration.

9. An outdoor cooker comprising:
an outdoor cooker body;
an upper cooker rack;
a lower cooker rack positioned under the upper cooker rack;
a lifting mechanism for the cooker racks, said lifting mechanism being attached to the outdoor cooker body and located at least partially vertically above the cooker racks;
the upper cooker rack, the lower cooker rack, the lifting mechanism, and the outdoor cooker body having a first configuration with the upper cooker rack supported by the outdoor cooker body and the lower cooker rack being one of supported by the outdoor cooker body and suspended from the upper cooker rack;
the upper cooker rack, the lower cooker rack, the lifting mechanism, and the outdoor cooker body having a second configuration with the upper cooker rack being suspended from the lifting mechanism and the lower cooker rack being supported by the outdoor cooker body;
the upper cooker rack, the lower cooker rack, the lifting mechanism, and the outdoor cooker body having a third configuration with the upper cooker rack and lower cooker rack being suspended from the lifting mechanism;
a vertically oriented guide being attached to the outdoor cooker body; and
the upper cooker rack has a member received in the guide; wherein the guide includes:
at least two guide rails mounted parallel to the travel of the cooker racks during the lifting of the racks;
a member received in between the guide rails that includes a plate that is operably attached to the upper cooker rack; and
the member including a vertically oriented plate being received in between the guide rails to impede a rotation of the upper cooker rack along a horizontal axis.

10. The outdoor cooker of claim 9 including a peripheral seal mounted in one of the lid and the cooker body.

11. The outdoor cooker of claim 9 wherein the first configuration includes;
the upper cooker rack being rested adjacent a top of the outdoor cooker body; and
the lower cooker rack operably attached to a plurality of prop rails upon the underside of the lower cooker rack and resting upon a bottom surface of the outdoor cooker body.

12. An outdoor cooker comprising:
an outdoor cooker body;
an upper cooker rack;
a lower cooker rack positioned under the upper cooker rack;
a lifting mechanism for the cooker racks, said lifting mechanism being attached to the outdoor cooker body and located at least partially vertically above the cooker racks;
the upper cooker rack, the lower cooker rack, the lifting mechanism, and the outdoor cooker body having a first configuration with the upper cooker rack supported by the outdoor cooker body and the lower cooker rack being one of supported by the outdoor cooker body and suspended from the upper cooker rack;
the upper cooker rack, the lower cooker rack, the lifting mechanism, and the outdoor cooker body having a second configuration with the upper cooker rack being suspended from the lifting mechanism and the lower cooker rack being supported by the outdoor cooker body; and
the upper cooker rack, the lower cooker rack, the lifting mechanism, and the outdoor cooker body having a third configuration with the upper cooker rack and lower cooker rack being suspended from the lifting mechanism;
wherein the second configuration includes;
the upper cooker rack being suspended from the lifting mechanism above the outdoor cooker body; and
the lower cooker rack operably attached to a plurality of prop rails upon the underside of the lower cooker rack and resting upon a bottom surface of the outdoor cooker body.

13. An outdoor cooker comprising:
an outdoor cooker body;
an upper cooker rack;
a lower cooker rack positioned under the upper cooker rack;
a lifting mechanism for the cooker racks, said lifting mechanism being attached to the outdoor cooker body and located at least partially vertically above the cooker racks;
the upper cooker rack, the lower cooker rack, the lifting mechanism, and the outdoor cooker body having a first configuration with the upper cooker rack supported by the outdoor cooker body and the lower cooker rack being one of supported by the outdoor cooker body and suspended from the upper cooker rack;
the upper cooker rack, the lower cooker rack, the lifting mechanism, and the outdoor cooker body having a second configuration with the upper cooker rack being suspended from the lifting mechanism and the lower cooker rack being supported by the outdoor cooker body; and
the upper cooker rack, the lower cooker rack, the lifting mechanism, and the outdoor cooker body having a third configuration with the upper cooker rack and lower cooker rack being suspended from the lifting mechanism;
wherein the third configuration includes the upper cooker rack being suspended from the lifting mechanism above the outdoor cooker body and the lower cooker rack being suspended from the lifting mechanism above a bottom surface of the outdoor cooker body and coupled to the upper cooker rack by a coupling; and
the coupling includes a plurality of vertically spaced hooks for adjusting a separation distance between the upper cooker rack and the lower cooker rack when in the first and third configuration.

14. A method of variably positioning a lid for an outdoor cooker comprising:
moving a lid from a closed position to a partially open position about a pivot bar pivotally attaching the lid to an outdoor cooker body;

the moving step includes lifting the lid and biasing the lid away from a closed position with a biasing device, wherein the biasing device reduces an overall net downward force of the lid resulting from a weight of the lid;

stopping the lid in a partially open position by ending the lifting portion of the moving step;

frictionally maintaining the lid in the partially open position against an action of the biasing device and the weight of the lid with a rotational friction, neutral stop braking device; and adjusting a static friction level of the rotational friction, neutral stop braking device.

15. The method of claim 14 wherein the biasing step includes;

positioning a torsion spring of the biasing device about the pivot bar; and increasing a torsional pre-load on the spring throughout movement from a fully open position to a closed position.

16. The method of claim 15 wherein the frictionally maintaining of the lid includes pushing a first surface against a second surface by using a compression spring; and the adjusting step includes moving a spring adjuster on threads toward or away from the compression spring.

17. The method of claim 16 including accessing a lower cooker rack at least in part by raising an upper cooker rack via a lifting mechanism; and cleaning the outdoor cooker at least in part by raising the upper cooker rack and the lower cooker rack away from the bottom of the outdoor cooker body using the lifting mechanism and removing debris from a bottom of the outdoor cooker body through a side door of a firebox attached to the outdoor cooker body.

18. The method of claim 17 including a step of contacting the lid and the cooker body with a peripheral rope seal by moving the lid to the closed position.

\* \* \* \* \*